(12) United States Patent
Kim et al.

(10) Patent No.: US 8,617,696 B2
(45) Date of Patent: Dec. 31, 2013

(54) MULTILAYERED ALIPHATIC POLYESTER FILM

(75) Inventors: Kyung-Youn Kim, Suwon-si (KR); Sang-Il Kim, Suwon-si (KR)

(73) Assignee: SKC Co., Ltd, Suwon-si (KR)

( * ) Notice: Subject to any disclaimer, the term of this patent is extended or adjusted under 35 U.S.C. 154(b) by 643 days.

(21) Appl. No.: 12/521,841

(22) PCT Filed: Jan. 3, 2008

(86) PCT No.: PCT/KR2008/000032
§ 371 (c)(1),
(2), (4) Date: Jun. 30, 2009

(87) PCT Pub. No.: WO2008/082256
PCT Pub. Date: Jul. 10, 2008

(65) Prior Publication Data
US 2010/0055428 A1 Mar. 4, 2010

(30) Foreign Application Priority Data
Jan. 3, 2007 (KR) .................. 10-2007-0000483

(51) Int. Cl.
B32B 7/02 (2006.01)
B32B 27/36 (2006.01)

(52) U.S. Cl.
USPC .......................... 428/213; 428/480

(58) Field of Classification Search
USPC .................................. 428/213, 480
See application file for complete search history.

(56) References Cited

U.S. PATENT DOCUMENTS

| | | | | |
|---|---|---|---|---|
| 6,051,663 A * | 4/2000 | Yamamoto et al. | ........... | 525/437 |
| 6,153,276 A | 11/2000 | Oya et al. | | |
| 2004/0191440 A1* | 9/2004 | Funaki et al. | ................ | 428/34.6 |
| 2005/0227099 A1 | 10/2005 | Hiruma | | |
| 2005/0287358 A1 | 12/2005 | Inglis | | |
| 2006/0177674 A1* | 8/2006 | Aritake et al. | ................ | 428/458 |
| 2007/0099016 A1 | 5/2007 | Nakamura et al. | | |
| 2008/0136998 A1* | 6/2008 | Sakata et al. | .................... | 349/62 |

FOREIGN PATENT DOCUMENTS

| | | |
|---|---|---|
| CN | 1643060 A | 7/2005 |
| CN | 1826225 A | 8/2006 |
| EP | 1671786 A1 | 6/2006 |
| JP | 10-151715 A | 6/1998 |
| JP | 2003-094585 A | 4/2003 |
| JP | 2004-268372 A | 9/2004 |
| JP | 2005-335095 A | 12/2005 |
| JP | 2006-240112 A | 9/2006 |
| KR | 1020050102639 A | 10/2005 |
| KR | 1020060052827 A | 5/2006 |
| WO | 2006/075634 A1 | 7/2006 |

OTHER PUBLICATIONS

British Office Action issued in corresponding GB Application No. GB0912456.1, dated Jan. 13, 2011.
British Office Action issued in corresponding GB Application No. GB0912456.1, dated Mar. 16, 2011.
Chinese Office Action issued in corresponding CN Application No. 200880001677.X, dated Jan. 31, 2011.

* cited by examiner

Primary Examiner — Maria Veronica Ewald
Assistant Examiner — Tahseen N Khan
(74) Attorney, Agent, or Firm — Sughrue Mion, PLLC

(57) ABSTRACT

A multilayered aliphatic polyester film of the present invention comprising a first resin layer and a second resin layer laminated on one or both sides of the first resin layer, the first resin layer containing a polylactic-based polymer comprising L-lactic acid in an amount ranging from 50 to 100% by weight, and the second resin layer containing a polylactic-based polymer comprising D-lactic acid in an amount ranging from 5 to 20% by weight, can be easily peeled off by pulling with hands, and has improved heat adhesiveness, heat resistance, transparency, impact resistance, perforation resistance and dimensional stability. Accordingly, it is useful for packaging materials, especially as a disposable film lid for plastic containers.

10 Claims, No Drawings

MULTILAYERED ALIPHATIC POLYESTER FILM

CROSS REFERENCE TO RELATED APPLICATION

This application is a National Stage of International Application No. PCT/KR2008/000032 filed Jan. 3, 2008, claiming priority based on Korean Patent Application No. 10-2007-0000483, filed Jan. 3, 2007, the contents of all of which are incorporated herein by reference in their entirety.

FIELD OF THE INVENTION

The present invention is directed to a multilayered aliphatic polyester film having improved heat adhesiveness, heat resistance, transparency, impact resistance, perforation resistance and dimensional stability.

BACKGROUND OF THE INVENTION

In the packaging industry, it is conventional that a product is packaged in a plastic film or a rigid plastic package which is then heat sealed.

Conventional heat-sealing plastic films such as polyvinyl chloride, polyethylene and polypropylene films are not completely satisfactory in terms of their performance characteristics. For example, polyvinyl chloride films generate toxic pollutants when incinerated, and polyethylene films have been employed only for low-grade packaging materials due to their relatively poor dimensional and mechanical properties. Heat-adhesive polypropylene films, on the other hand, have satisfactory mechanical properties, but generate unbiodegradable decomposition products. In order to solve such problems, there have been employed biodegradable aliphatic polyesters, particularly polylactic acid films. However, such films have poor heat adhesiveness and flexibility due to their high crystallinity.

In order to solve such problems, there have been employed biodegradable aliphatic polyesters, particularly polylactic acid-based films.

For example, Japanese Laid-open Patent Publication Nos. 1997-157408 and 2004-109000 disclose a multilayered film composed of a polylactic acid polymer, and an aliphatic polyester resin having a glass transition temperature (Tg) of 0° C. or lower. However, the heat shrinkages of these films are significantly high due to their relatively poor heat resistance. Further, the seal is not easily openable by pulling with hands.

Japanese Laid-open Patent Publication No. 2003-170560 discloses a multilayered film comprising an amorphous lactic acid-based resin layer as a heat-sealant layer. However, the film is not satisfactory for packaging because the film turns cloudy while the package is subjected to a hot bath treatment.

SUMMARY OF THE INVENTION

Accordingly, it is an object of the present invention to provide a multilayered aliphatic polyester film useful for packaging, which is peelable after heat sealing and has improved heat adhesiveness, heat resistance, transparency, impact resistance, perforation resistance and dimensional stability.

In accordance with the present invention, there is provided a multilayered aliphatic polyester film comprising a first resin layer and a second resin layer laminated on one or both sides of the first resin layer, wherein:

the first resin layer contains a polylactic acid-based polymer comprising L-lactic acid in an amount ranging from 50 to 100% by weight and the second resin layer contains a polylactic acid-based polymer comprising D-lactic acid in an amount ranging from 5 to 20% by weight; and the multilayered aliphatic polyester film has a heat of fusion ($\Delta Hm$) of 0.5 to 20 J/g and a haze of 20% or less after being subjected to hot bath treatment at 85° C. for 30 minutes, and a heat adhesive strength of 300 to 1500 gf/inch.

DETAILED DESCRIPTION OF THE INVENTION

The multilayered aliphatic polyester film in accordance with the present invention comprises a first resin layer and a second resin layer laminated on one or both sides of the first resin layer. The first resin layer contains a polylactic acid-based polymer comprising L-lactic acid in an amount ranging from 50 to 100% by weight, preferably 70 to 100% by weight. The second resin layer contains a polylactic acid-based polymer comprising D-lactic acid in an amount of 5 to 20% by weight, preferably 5 to 9% by weight.

When the amount of the L-lactic acid of the first resin layer is less than 50% by weight, the film may have poor mechanical property and high heat shrinkage, and when the amount of the D-lactic acid of the second resin layer (heat-sealant layer) is more than 20% by weight, the heat resistance and haze of the resulting film may not be satisfactory.

The polylactic acid-based polymer that can be further used in the first resin layer may be D-lactic acid in an amount ranging from 0 to 50% by weight, preferably 0 to 30% by weight, and the polylactic acid-based polymer that can be further used in the second resin layer may be L-lactic acid in an amount ranging from 80 to 95% by weight, preferably 91 to 95% by weight.

The polyester film in accordance with the present invention has a heat of fusion of 0.5 to 20 J/g, preferably 1 to 10 J/g after being subjected to hot bath treatment at 85° C. for 30 minutes. When the heat of fusion of the film is more than 20 J/g, the heat adhesive strength may become poor, and the perforation resistance and impact resistance of the resulting film become unsatisfactory, and when less than 0.5 J/g, the surface of film becomes cloudy due to the heat resistance deterioration.

The polyester film in accordance with the present invention has an adhesive strength of 300 gf/inch to 1500 gf/inch, preferably 400 gf/inch to 800 gf/inch. When the heat adhesive strength of the film is more than 1500 gf/inch, the film is not easily peeled off without destroying the integrity of the film itself, and when less than 300 gf/inch, the seal may be easily opened, allowing leakage of contents.

In addition, the polyester film in accordance with the present invention has a haze of 20% or less, preferably 10% or less after being subjected to heat treatment at 85° C. for 30 minutes.

A polyester film in accordance with the present invention has an impact absorption energy per unit thickness of 0.5 kgf-cm/µm or more. When the impact absorption energy per unit thickness of the film is less than 0.5 kgf-cm/µm, the package heat-sealed with the film may be easily broken by an external impact, e.g., during storage and transportation.

A polyester film in accordance with the present invention has a perforation strength of 0.8 kgf or more. When the perforation strength of the film is less than 0.8 kgf, the resultant film may be easily tore by an sharp edge of another packages.

The polyester film in accordance with the present invention has a heat shrinkage in the longitudinal or transverse direction of 5% or less, preferably 3% or less when subjected to hot air treatment at 100° C. for 5 minutes. When the heat shrinkage of the film exceeds 5%, printability of the film becomes poor.

In accordance with the present invention, the multilayered aliphatic polyester film may be prepared by co-extruding the first resin layer and the second resin layer, and drawing in the longitudinal and transverse directions by a conventional method, followed by heat treatment.

The resulting film has a thickness ranging from 5 to 300 μm, and the thickness ratio of the first resin layer:the second resin layer may range from 1:1 to 20:1, preferably 5:1 to 9:1. When the second resin layer is too thick, the dimensional stability becomes unsatisfactory due to their poor crystallinity, and when the first resin layer is too thick, the heat adhesive strength of the film may be unsatisfactorily low.

As described above, the inventive multilayered aliphatic polyester films can be easily peeled off by pulling with hands, and has improved heat adhesiveness, heat resistance, transparency, impact resistance, perforation resistance and dimensional stability. Accordingly, it is useful for packaging materials, especially as a disposable film lid for plastic containers.

The following Examples are given for the purpose of illustration only, and are not intended to limit the scope of the invention.

EXAMPLE 1

A first resin (A), polylactic acid-based resin (4032D, Nature Works LLC.) containing 98.5% by weight of L-lactic acid and 1.5% by weight of D-lactic acid, and a second resin (B), polylactic acid-based resin (4042D, Nature Works LLC.) containing 94.5% by weight of L-lactic acid and 5.5% by weight of D-lactic acid were melt-extruded by introducing them into a respective feed blocks of two extruders, to obtain a laminate having the first and second resin layers at 5:1. The laminate thus obtained was passed through a T-die and cooled on a cooling drum to obtain a double-layered coextruded sheet.

The coextruded sheet thus obtained was drawn at a draw ratio of 3.0 in the longitudinal direction at 75° C. and at a draw ratio of 3.8 in the transverse direction at 85° C., heat set at 140° C., and subjected to relaxation to a degree of 3%, to obtain a biaxially drawn polyester film of 20 μm thickness.

EXAMPLE 2

The procedure of Example 1 was repeated except for using, as the first resin layer (A), polylactic acid-based resin (4032D, Nature Works LLC.) containing 98.5% by weight of L-lactic acid and 1.5% by weight of D-lactic acid, and a second resin (B), polylactic acid-based resin (4050D, Nature Works LLC.) containing 91% by weight of L-lactic acid and 9% by weight of D-lactic acid, to obtain a double-layered (A/B) coextruded sheet.

The double-layered coextruded sheet thus obtained was drawn at a draw ratio of 3.0 in the longitudinal direction at 75° C. and at a draw ratio of 3.8 in the transverse direction at 80° C., heat set at 130° C., and subjected to relaxation to a degree of 3%, to obtain a biaxially drawn polyester film of 20 μm thickness.

COMPARATIVE EXAMPLE 1

The procedure of Example 1 was repeated except for using, as the first resin layer (A), polylactic acid-based resin (4032D, Nature Works LLC.) containing 98.5% by weight of L-lactic acid and 1.5% by weight of D-lactic acid, and the second resin (B), polylactic acid-based resin (Musashino chemical laboratory, Ltd.) containing 70% by weight of L-lactic acid and 30% by weight of D-lactic acid, to obtain a double-layered (A/B) coextruded sheet.

The double-layered coextruded sheet thus obtained was drawn at a draw ratio of 3.0 in the longitudinal direction at 70° C. and at a draw ratio of 3.8 in the transverse direction at 80° C., heat set at 130° C., and subjected to relaxation to a degree of 3%, to obtain a biaxially drawn polyester film of 20 μm thickness.

COMPARATIVE EXAMPLE 2

The procedure of Example 1 was repeated except for using, as the first resin layer (A), polylactic acid-based resin (4032D, Nature Works LLC.) containing 98.5% by weight of L-lactic acid and 1.5% by weight of D-lactic acid, and the second resin (B), polylactic acid-based resin (4032D, Nature Works LLC.) containing 98.5% by weight of L-lactic acid and 1.5% by weight of D-lactic acid, to obtain a double-layered (A/B) coextruded sheet.

The double-layered coextruded sheet thus obtained was drawn at a draw ratio of 3.0 in the longitudinal direction at 75° C. and at a draw ratio of 3.8 in the transverse direction at 90° C., heat set at 145° C., and subjected to relaxation to a degree of 3%, to obtain a biaxially drawn polyester film of 20 μm thickness.

COMPARATIVE EXAMPLE 3

The procedure of Example 1 was repeated except for using, as the first resin layer (A), polylactic acid-based resin (4032D, Nature Works LLC.) containing 98.5% by weight of L-lactic acid and 1.5% by weight of L-lactic acid, and the second resin (B), polylactic acid-based resin (Musashino chemical laboratory, Ltd.) containing 60% by weight of L-lactic acid and 40% by weight of D-lactic acid, to obtain a double-layered (A/B) coextruded sheet.

The double-layered coextruded sheet thus obtained was drawn at a draw ratio of 3.0 in the longitudinal direction at 70° C. and at a draw ratio of 3.8 in the transverse direction at 75° C., heat set at 130° C., and subjected to relaxation to a degree of 3%, to obtain a biaxially drawn polyester film of 20 μm thickness.

Performance Test

The polyester films obtained in Examples 1 and 2 and Comparative Examples 1 through 3 were each assessed for the following properties. The results are shown in Table 1.

(1) Thermal Characteristics

Differential scanning calorimeter (Perkin-Elmer DSC) analysis was performed at a temperature programming rate of 10° C./min after being subjected to hot bath treatment at 85° C. for 30 minutes. The heat of fusion (ΔHm, J/g) was determined by calculating the peak areas of the first peak in the crystallization temperature, and the next peak in the heat absorption peak.

(2) Heat Adhesive Strength

Two film samples each cut into a 15 mm (width)×150 mm (length) piece were placed such that the heat-adhesive layers thereof faced each other, and pressed under a heat gradient (40 psi/sec and 90° C.). The fused films were subjected to peeling with a 180° peel tester at 300 m/min, and the heat adhesive strength (gf/inch) was measured by the force at the peeling point.

(3) Haze

The haze (%) of a film sample was measured with a hazemeter (Model NDH-5000W, Nippon Denshoku) after being subjected to heat treatment at 85° C. for 30 minutes.

(4) Impact Absorption Energy

The impact absorption energy was measured according to ASTM D 3420 with Film Impact Tester (Toyoseiki Inc.). The Pendulum tip used was in the form of hemisphere with a diameter of 1 inch. A sample film was fitted on the sample fixture having a 50 mm-diameter circular hole. The impact absorption energy (kgf-cm), thus measured, was divided by the sample film thickness (μm) to determine the impact absorption energy per unit thickness (kgf-cm/μm). An average value derived from 10 tests was taken to represent each sample.

(5) Perforation Strength

The perforation resistance (kgf) was measured according to ASTM D 882 with Compression mode (AGS-500D, Shimadzu). The tip used was in the form of sphere with a diameter of 1 inch. An average value derived from 10 tests was taken to represent each sample at a compression rate of 50 mm/min.

(6) Heat Shrinkage

A sample having the size of 200 mm length and 15 mm width was maintained at 100° C. in a circulating air oven for 5 minutes, as the changes in the film length was measured. Using the following equation, the degrees of shrinkage in the longitudinal and the transverse directions were calculated.

Heat shrinkage (%)=(Length before heat treatment–Length after heat treatment)/Length before heat treatment×100

TABLE 1

| | First resin layer(A) L-lactic acid (% by weight) | Second resin layer(B) D-lactic acid (% by weight) | Film performance | | | | | |
|---|---|---|---|---|---|---|---|---|
| | | | Heat of fusion (ΔHm, J/g) | Heat adhesive strength (gf/inch) | Haze (%) | Impact absorption energy (kgf-cm/μm) | Perforation strength (kgf) | Heat shrinkage (longitudinal/ transverse) |
| Example 1 | 98.5 | 5.5 | 2.8 | 800 | 1.5 | 1.0 | 0.81 | 2.5/1.5 |
| Example 2 | 98.5 | 9 | 1.5 | 1200 | 4.0 | 0.8 | 0.88 | 3.0/1.5 |
| Comparative Example 1 | 98.5 | 30 | — | 2000 | 40.0 | 0.4 | 0.89 | 3.5/2.0 |
| Comparative Example 2 | 98.5 | 1.5 | 53 | 100 | 1.5 | 0.3 | 0.75 | 2.5/1.5 |
| Comparative Example 3 | 98.5 | 40 | 0.2 | 1900 | 35.0 | 0.2 | 0.70 | 8.0/7.0 |

As shown in Table 1, the inventive multilayered aliphatic polyester films can be easily peeled off by pulling with hands after heat-sealing and show improved properties in terms of heat adhesiveness, heat resistance, transparency, impact resistance, perforation resistance and dimensional stability, as compared with those of Comparative Examples 1 to 3.

While the invention has been described with respect to the above specific embodiments, it should be recognized that various modifications and changes may be made to the invention by those skilled in the art which also fall within the scope of the invention as defined by the appended claims.

What is claimed is:

1. A multilayered aliphatic polyester film comprising a first resin layer and a second resin layer laminated on one or both sides of the first resin layer, wherein:

the first resin layer is formed from a polylactic-based polymer comprising L-lactic acid in an amount ranging from 98 to 100% by weight, and the second resin layer is formed from one polylactic-based polymer comprising D-lactic acid in an amount ranging from 5 to 10% by weight; and the polyester film has a heat of fusion (ΔHm) of 1.0 to 10 J/g and a haze of 20% or less after being subjected to hot bath treatment at 85° C. for 30 minutes, and a heat adhesive strength of 800 to 1500 gf/inch.

2. The multilayered aliphatic polyester film of claim 1, wherein a thickness ratio of the first resin layer and the second resin layer is in the range of 1:1 to 20:1.

3. The multilayered aliphatic polyester film of claim 1, which has an impact absorption energy per unit thickness of 0.5 kgf-cm/μm or more.

4. The multilayered aliphatic polyester film of claim 1, which has a perforation strength of 0.8 kgf or more.

5. The multilayered aliphatic polyester film of claim 1, which has a heat shrinkage in the longitudinal and transverse directions of 5% or less when subjected to hot air at 100° C. for 5 minutes.

6. A wrapping material comprising a multilayered aliphatic polyester film, the multilayered aliphatic polyester film comprising a first resin layer and a second resin layer laminated on one or both sides of the first resin layer, wherein:

the first resin layer contains a polylactic-based polymer comprising L-lactic acid in an amount ranging from 50 to 100% by weight, and the second resin layer contains one polylactic-based polymer comprising D-lactic acid in an amount ranging from 5 to 20% by weight; and the polyester film has a heat of fusion (ΔHm) of 1.0 to 10 J/g and a haze of 20% or less after being subjected to hot bath treatment at 85° C. for 30 minutes, and a heat adhesive strength of 300 to 1500 gf/inch.

7. The wrapping material of claim 6, wherein a thickness ratio of the first resin layer and the second resin layer is in the range of 1:1 to 20:1.

8. The wrapping material of claim 6, which has an impact absorption energy per unit thickness of 0.5 kgf-cm/μm or more.

9. The wrapping material of claim 6, which has a perforation strength of 0.8 kgf or more.

10. The wrapping material of claim 6, which has a heat shrinkage in the longitudinal and transverse directions of 5% or less when subjected to hot air at 100° C. for 5 minutes.

* * * * *